United States Patent
Fujiwara

(10) Patent No.: US 10,623,598 B2
(45) Date of Patent: Apr. 14, 2020

(54) IMAGE PROCESSING APPARATUS AND NON-TRANSITORY COMPUTER READABLE MEDIUM FOR EXTRACTING AND CONNECTING INHERENT REGIONS OF MULTIPLE PAGES OF DOCUMENT DATA

(71) Applicant: FUJI XEROX CO., LTD., Tokyo (JP)

(72) Inventor: Kumi Fujiwara, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 141 days.

(21) Appl. No.: 15/484,504

(22) Filed: Apr. 11, 2017

(65) Prior Publication Data

US 2018/0137352 A1 May 17, 2018

(30) Foreign Application Priority Data

Nov. 16, 2016 (JP) .................................. 2016-223112

(51) Int. Cl.
*G06K 9/00* (2006.01)
*G06K 9/34* (2006.01)
*H04N 1/00* (2006.01)

(52) U.S. Cl.
CPC ..... *H04N 1/00816* (2013.01); *G06K 9/00449* (2013.01); *G06K 9/00483* (2013.01); *G06K 2209/01* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 5,815,704 A | 9/1998 | Shimotsuji et al. | |
| 7,194,144 B1* | 3/2007 | Sakai | G06T 11/60 382/284 |
| 7,433,494 B2* | 10/2008 | Niwa | B60R 25/104 348/169 |
| 7,492,929 B2* | 2/2009 | Itoh | G06K 9/00087 382/124 |
| 9,282,145 B2* | 3/2016 | Wei | G06F 16/00 |
| 9,311,425 B2* | 4/2016 | Mahan | G06F 15/16 |
| 9,870,349 B2* | 1/2018 | Wei | G06F 9/46 |
| 2004/0057600 A1* | 3/2004 | Niwa | B60R 25/104 382/103 |
| 2005/0271261 A1* | 12/2005 | Onishi | G06T 7/001 382/149 |
| 2008/0074685 A1* | 3/2008 | Sakamoto | H04N 1/6072 358/1.9 |
| 2012/0254741 A1 | 10/2012 | Watanabe | |

FOREIGN PATENT DOCUMENTS

| | | |
|---|---|---|
| JP | H08-235341 A | 9/1996 |
| JP | 2012-216094 A | 11/2012 |

* cited by examiner

*Primary Examiner* — Feng Niu
(74) *Attorney, Agent, or Firm* — Oliff PLC

(57) ABSTRACT

An image processing apparatus includes a common region determination unit, an inherent region extraction unit, and an inherent region connection unit. The common region determination unit determines page common regions which are in common among plural pages of document data. The inherent region extraction unit extracts, as page inherent regions, regions other than the page common regions determined by the common region determination unit from image data in the plural pages. The inherent region connection unit connects plural page inherent regions extracted by the inherent region extraction unit.

9 Claims, 16 Drawing Sheets

FIG. 7A p.1 — IN WITNESS WHEREOF, the parties hereto have executed this Agreement in
D-2013 (F)

p.2 — duplicate with their signatures thereon.
D-2013 (F)

FIG. 7B p.1 — IN WITNESS WHREOF, the parties hereto have caused
D-2015 (F)

p.2 — this agreement in duplicate with their signatures thereon.
D-2015 (F)

| CHARACTER-LINE IMAGE | X COORDINATES | Y COORDINATES | HEIGHT | WIDTH | NUMBER OF BLACK PIXELS |
|---|---|---|---|---|---|
| L1 | 620 | 600 | 136 | 35 | 140 |
| M1 | 622 | 600 | 136 | 35 | 138 |
| ... | ... | ... | ... | ... | ... |

IMAGE PROCESSING APPARATUS AND NON-TRANSITORY COMPUTER READABLE MEDIUM FOR EXTRACTING AND CONNECTING INHERENT REGIONS OF MULTIPLE PAGES OF DOCUMENT DATA

CROSS-REFERENCE TO RELATED APPLICATIONS

This application is based on and claims priority under 35 USC 119 from Japanese Patent Application No. 2016-223112 filed Nov. 16, 2016.

BACKGROUND

Technical Field

The present invention relates to an image processing apparatus and a non-transitory computer readable medium.

SUMMARY

According to an aspect of the invention, there is provided an image processing apparatus including a common region determination unit, an inherent region extraction unit, and an inherent region connection unit. The common region determination unit determines page common regions which are in common among plural pages of document data. The inherent region extraction unit extracts, as page inherent regions, regions other than the page common regions determined by the common region determination unit from image data in the plural pages. The inherent region connection unit connects plural page inherent regions extracted by the inherent region extraction unit.

BRIEF DESCRIPTION OF THE DRAWINGS

Exemplary embodiments of the present invention will be described in detail based on the following figures, wherein:

FIG. 7A is a diagram illustrating pages 1 and 2 of old image data;

FIG. 7B is a diagram illustrating pages 1 and 2 of new image data;

DETAILED DESCRIPTION

Exemplary embodiments of the present invention will be described in detail with reference to the drawings.

Figure 1:
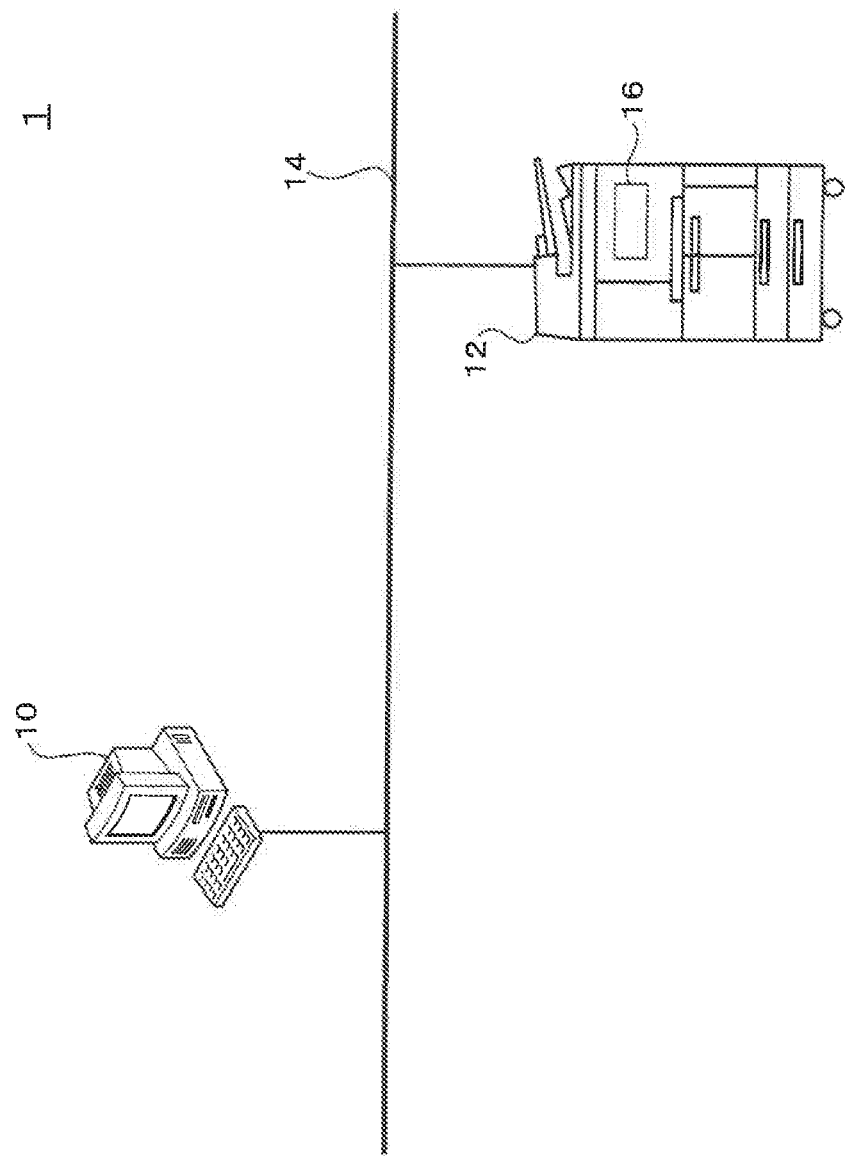
FIG. 1 is a diagram illustrating a system configuration of an image forming system according to an exemplary embodiment of the present invention.

FIG. 1 is a diagram illustrating a system configuration of an image forming system according to an exemplary embodiment of the present invention.

An image forming system 1 according to an exemplary embodiment of the present invention includes, as illustrated in FIG. 1, a terminal apparatus 10 and an image forming apparatus 12, which are connected to each other via a network 14. The terminal apparatus 10 generates print data, and transmits the generated print data to the image forming apparatus 12 via the network 14. The image forming apparatus 12 receives the print data transmitted from the terminal apparatus 10, and outputs an image corresponding to the print data to paper. The image forming apparatus 12 is a so-called multifunction machine provided with multiple functions including a print function, a scan function, a copy function, and a facsimile function.

The image forming apparatus 12 has a structure in which a differential image generation device 16 may be added as an optional function. The differential image generation device 16 is provided with a function of receiving image data of two pieces of document data to be compared with each other, such as old document data and new document data, detecting a difference between the two pieces of image data, and outputting, for example, indicating the detected difference on each of the two pieces of image data. For example, the differential image generation device 16 indicates a difference between two pieces of image data in each of the two pieces of image data by enclosing the different part in a frame, underlining the different part, indicating the different part in bold, or indicating the different part in a different color.

Specifically, the differential image generation device 16 determines page common regions, such as a header, a footer, and a page number, which are in common among plural pages of document data. Then, the differential image generation device 16 extracts regions other than the page common regions as page inherent regions, such as a body part and a table part, from image data of plural pages. The extracted plural page inherent regions are connected. A difference in the connected plural page inherent regions between two pieces of image data is detected. Furthermore, a difference in page common region in each page between two pieces of image data is detected.

In the case where two pieces of document data to be compared with each other are in the form of paper, documents are scanned with a scanner of the image forming apparatus 12 and are converted into image data, and the obtained image data are input to the differential image generation device 16, so that detection of a difference may be performed.

The image forming apparatus 12 prints and outputs an image generated based on differential image data generated by the differential image generation device 16 to printing paper or the like.

Figure 2:
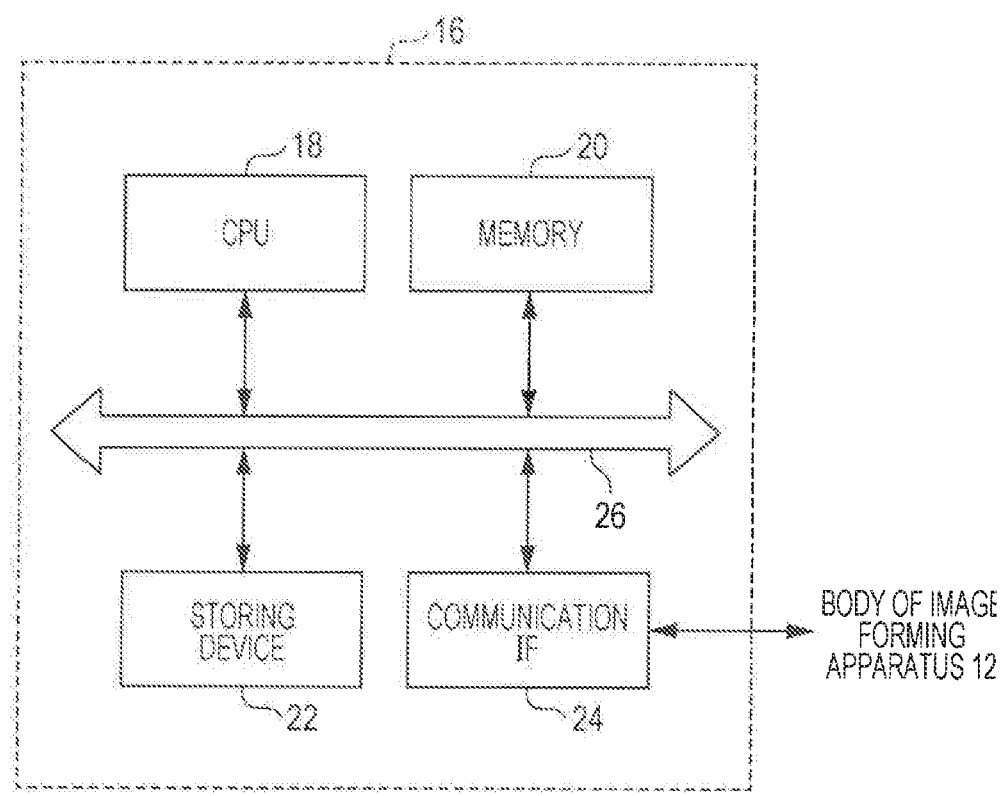
FIG. 2 is a block diagram illustrating a hardware configuration of a differential image generation device according to an exemplary embodiment of the present invention.

A hardware configuration of the differential image generation device 16 in the image forming system according to this exemplary embodiment is illustrated in FIG. 2.

The differential image generation device 16 includes, as illustrated in FIG. 2, a central processing unit (CPU) 18, a memory 20, a storing device 22, such as a hard disk drive (HDD), and a communication interface (IF) 24 which performs transmission and reception of data to and from the body of the image forming apparatus 12. The above components are connected to one another via a control bus 26.

The CPU 18 performs predetermined processing based on a control program stored in the memory 20 or the storing device 22, and controls the operation of the differential image generation device 16. In this exemplary embodiment, an explanation is provided in which the CPU 18 reads and executes a control program stored in the memory 20 or the storing device 22. However, the program may be stored in a storing medium such as a compact disc-read only memory (CD-ROM) and supplied to the CPU 18.

Figure 3:
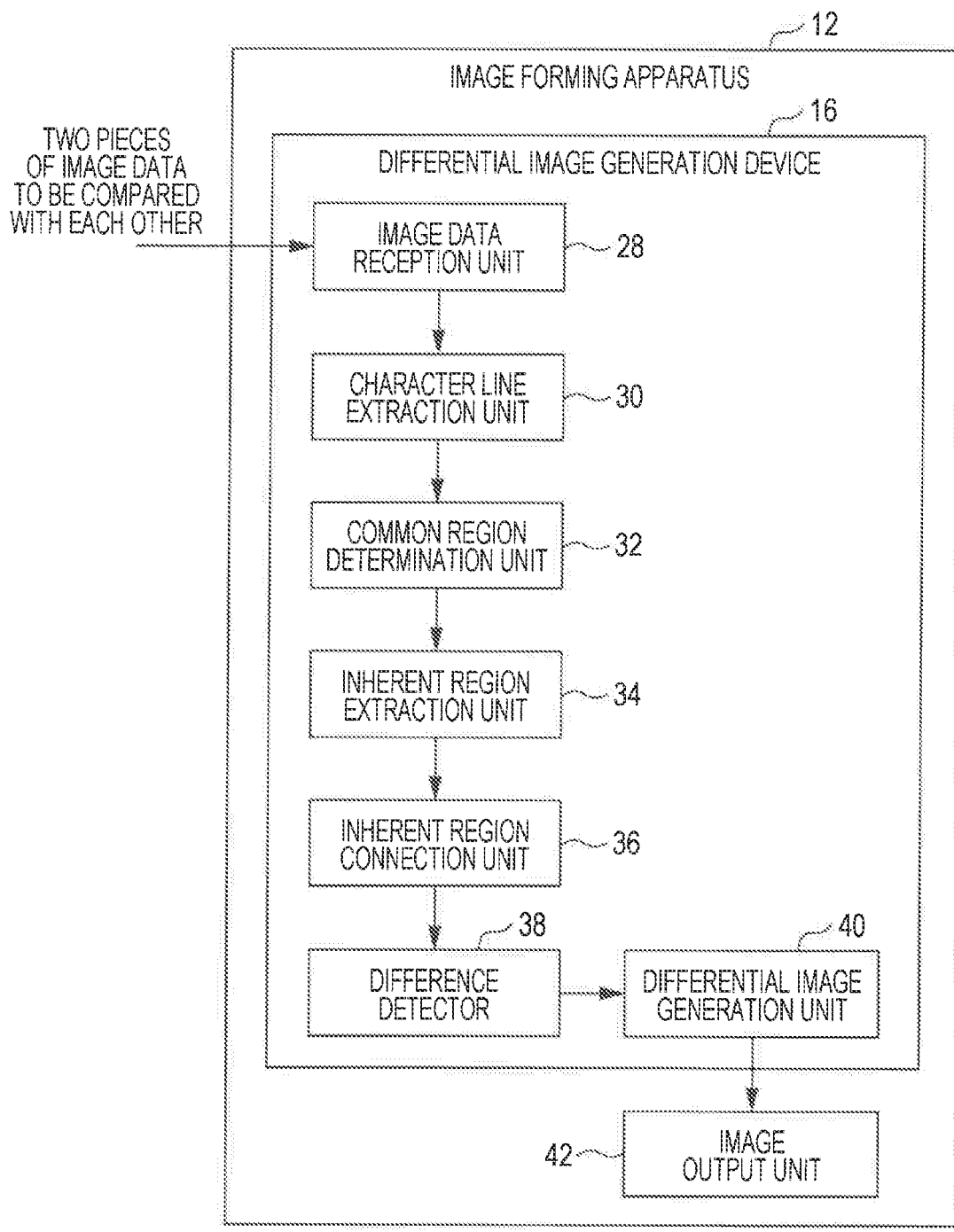
FIG. 3 is a block diagram illustrating a functional configuration of a differential image generation device according to an exemplary embodiment of the present invention.

FIG. 3 is a diagram illustrating a functional configuration of the differential image generation device 16 implemented when the CPU 18 executes a control program stored in the memory 20 or the storing device 22.

As illustrated in FIG. 3, the differential image generation device 16 according to this exemplary embodiment includes an image data reception unit 28, a character line extraction unit 30, a common region determination unit 32, an inherent region extraction unit 34, an inherent region connection unit 36, a difference detector 38, and a differential image generation unit 40.

The image data reception unit 28 receives image data of two pieces of document data to be compared with each other read with a scanner, which is not illustrated in figures, installed at the image forming apparatus 12.

The character line extraction unit 30 extracts character-line images included in image data of plural pages received by the image data reception unit 28. Specifically, the character line extraction unit 30 extracts character-line images from character images by using a projection histogram or the like.

The common region determination unit 32 determines page common regions such as a header and a footer which are in common among plural pages. That is, the common region determination unit 32 determines page common regions by determining whether or not character-line images extracted by the character line extraction unit 30 include similar character-line images in different pages of the same document. Specifically, the common region determination unit 32 acquires image features such as the number of black pixels included in a character-line image, a histogram of the black pixels, and the like, and determines, by comparing the acquired image features, whether or not the character-line image is a page common region.

Furthermore, the common region determination unit 32 determines whether or not character-line images included in two pieces of image data in different pages of the same document include two character-line images having a difference in width or height between the different pages, the difference being less than a threshold.

Furthermore, the common region determination unit 32 determines whether or not character-line images included in two pieces of image data in different pages of the same document include two character-line images having a difference in X coordinates or Y coordinates at, for example, an upper left point, which is an end point, of a character-line image between the different pages, the difference being less than a threshold.

Furthermore, the common region determination unit 32 determines whether or not character-line images included in two pieces of image data in different pages of the same document include two character-line images having image features included in character-line images in the different pages.

Furthermore, the common region determination unit 32 acquires character information such as a character code, coordinates, a character color, and the like included in a character-line image, and determines whether or not the character-line image is a page common region by comparing the acquired character information.

Furthermore, the common region determination unit 32 determines whether or not character information included in character-line images in different pages of the same document matches registration information registered as a page common region.

Furthermore, the common region determination unit 32 determines whether or not character-line images included in two pieces of image data in different pages of the same document are within a predetermined range in the different pages of the same document.

Furthermore, the common region determination unit 32 determines whether or not a character-line image included in image data in the same page of the same document is within a predetermined range from a region including a character-line image as a page common region in the same page of the same document.

The inherent region extraction unit 34 extracts, from image data of plural pages, regions other than the page common regions determined by the common region determination unit 32, as page inherent regions.

The inherent region connection unit 36 connects the plural page inherent regions extracted by the inherent region extraction unit 34.

The difference detector 38 extracts a difference between two pieces of image data. Specifically, as described above, the difference detector 38 extracts a difference between page inherent regions connected by the inherent region connection unit 36. Furthermore, the difference detector 38 detects a difference between page common regions in individual pages determined by the common region determination unit 32. That is, the difference detector 38 detects portions different between two pieces of image data by comparing page common regions in individual pages included in two pieces of image data to be compared with each other and comparing connected page inherent regions, separately.

The differential image generation unit 40 generates, for each of two pieces of image data, a differential image, which is an image representing a difference between the two pieces of image data detected by the difference detector 38. Furthermore, the differential image generation unit 40 transmits the generated differential image to an image output unit 42 of the image forming apparatus 12. The image output unit 42 prints and outputs the received differential image to printing paper.

Figure 4:
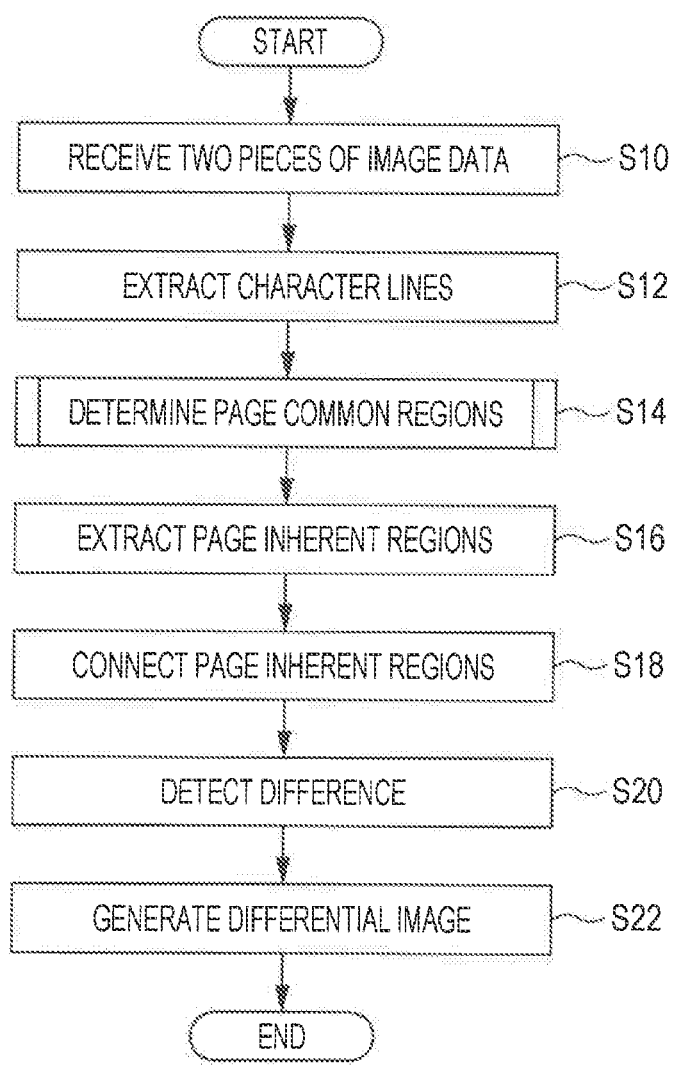
FIG. 4 is a flowchart illustrating a flow of a process of a differential image generation device according to an exemplary embodiment of the present invention.

Next, an operation of the differential image generation device 16 according to this exemplary embodiment will be described in detail with reference to a flowchart of FIG. 4.

First, the image data reception unit 28 receives image data of two pieces of document data to be compared with each other read with a scanner, which is not illustrated in figures, installed at the image forming apparatus 12 (step S10). In this exemplary embodiment, an explanation is provided in which the image data reception unit 28 receives two pieces of image data to be compared with each other read with a scanner installed at the image forming apparatus 12. However, the image data reception unit 28 may receive two pieces of image data to be compared with each other transmitted from the terminal apparatus 10 via the network 14.

Then, the character line extraction unit 30 extracts character-line images included in the individual pieces of image data in different pages of the same document received by the image data reception unit 28 (step S12), and the common region determination unit 32 determines whether or not the character-line images extracted by the character line extraction unit 30 are page common regions which are in common among plural pages of the same document (step S14). Then, the inherent region extraction unit 34 extracts, from the image data of the plural pages, regions other than the page common regions determined by the common region determination unit 32 as page inherent regions (step S16). Then, the inherent region connection unit 36 connects the plural page inherent regions extracted by the inherent region extraction unit 34 (step S18).

Then, the difference detector 38 detects, for the two pieces of image data, a difference between the two pieces of image data by comparing the page common regions in the individual pages and comparing the connected page inherent regions, separately (step S20). For example, the difference detector 38 detects portions different between old image data and new image data.

Then, the differential image generation unit 40 generates, for each of the two pieces of image data, a differential image, which represents the difference between the two pieces of image data detected in step S20 (step S22), and transmits the generated differential image to the image output unit 42 of the image forming apparatus 12. The generated differential image may be transmitted to the terminal apparatus 10 via the network 14.

Figure 5:
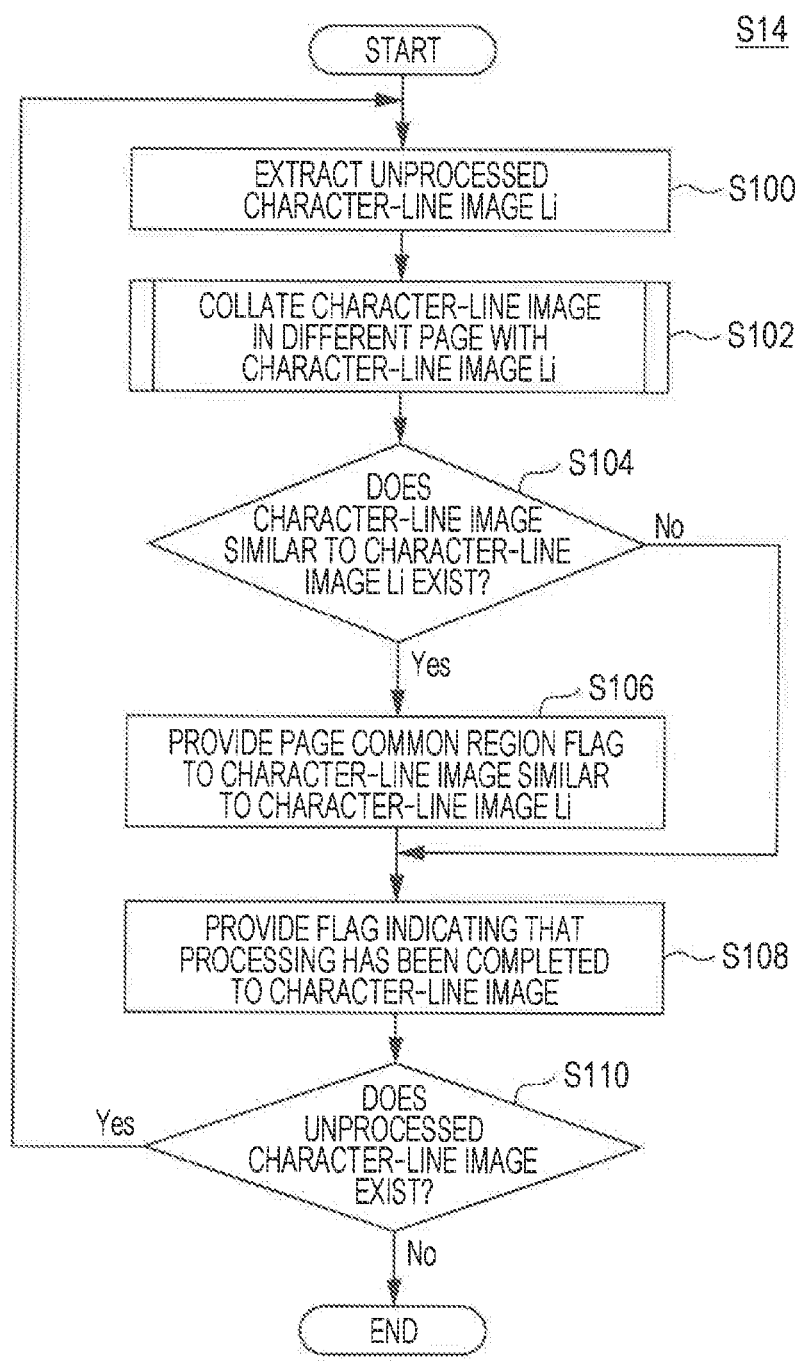
FIG. 5 is a flowchart for explaining the details of a page common region determination process (step S14) illustrated in FIG. 4.

Next, the details of the page common region determination process (step S14) illustrated in FIG. 4, which is performed for the same document, will be described with reference to a flowchart of FIG. 5.

First, the common region determination unit 32 extracts, from one page of the same document, an unprocessed character-line image Li extracted by the character line extraction unit 30 (step S100). The common region determination unit 32 collates a character-line image in a different page with the character-line image Li (step S102). In the case where a character-line image similar to the character-line image Li exists in the different page (Yes in step S104), the common region determination unit 32 determines a region including the character-line image Li and a region including the character-line image similar to the character-line image Li to be page common regions. Then, the common region determination unit 32 provides a page common region flag to each of the character-line image Li and the character-line image similar to the character-line image Li (step S106), and provides a flag indicating that processing has been completed to each of the character-line image Li and the character-line image similar to the character-line image Li (step S108).

In the case where it is determined in step S104 that no character-line image similar to the character-line image Li exists (No in step S104), the common region determination unit 32 provides a flag indicating that processing has been completed to the character-line image Li (step S108).

Then, the processing of steps S100 to S108 is repeatedly performed for all the character-line images in the two pieces of image data (step S110).

Next, the details of the character-line image collation process (step S102) illustrated in FIG. 5 will be described with reference to a flowchart of FIG. 6, by way of example of a collation process for a character-line image Li and a character-line image Mk, which are included in individual pieces of image data in different pages of the same document.

First, a character-line image Mk in an unprocessed different page is extracted (step S200). Then, the common region determination unit 32 detects the width of each of the character-line image Li and the character-line image Mk, and determines whether or not the difference between the width of the character-line image Li and the width of the character-line image Mk is less than a threshold T1 (step S202).

In the case where it is determined in step S202 that the difference between the width of the character-line image Li and the width of the character-line image Mk is less than the threshold T1 (Yes in step S202), the common region determination unit 32 detects the height of each of the character-line image Li and the character-line image Mk, and determines whether or not the difference between the height of the character-line image Li and the height of the character-line image Mk is less than a threshold T2 (step S204).

In the case where it is determined in step S202 that the difference between the width of the character-line image Li and the width of the character-line image Mk is equal to or more than the threshold T1 (No in step S202), the common region determination unit 32 provides a flag indicating that processing has been completed to the character-line image Mk (step S214).

In the case where it is determined in step S204 that the difference between the height of the character line image Li and the height of the character-line image Mk is less than the threshold T2 (Yes in step S204), the common region determination unit 32 detects the number of black pixels in each of the character-line image Li and the character-line image Mk, and determines whether or not the difference between the number of black pixels in the character-line image Li and the number of black pixels in the character-line image Mk is less than a threshold T3 (step S206).

In the case where it is determined in step S204 that the difference between the height of the character-line image Li and the height of the character-line image Mk is equal to or more than the threshold T2 (No in step S204), the common region determination unit 32 provides a flag indicating that processing has been completed to the character-line image Mk (step S214).

In the case where it is determined in step S206 that the difference between the number of black pixels in the character-line image Li and the number of black pixels in the character-line image Mk is less than the threshold T3 (Yes in step S206), the common region determination unit 32 detects X coordinates at an upper left point of each of the character-line image Li and the character-line image Mk, and determines whether or not the difference between the X coordinates at the upper left point of the character-line image Li and the X coordinates at the upper left point of the character-line image Mk is less than a threshold T4 (step S208).

In the case where it is determined in step S206 that the difference between the number of black pixels in the character-line image Li and the number of black pixels in the character-line image Mk is equal to or more than the threshold T3 (No in step S206), the common region determination unit 32 provides a flag indicating that processing has been completed to the character-line image Mk (step S214).

In the case where it is determined in step S208 that the difference between the X coordinates at the upper left point in the character-line image Li and the X coordinates at the upper left point in the character-line image Mk is less than the threshold T4 (Yes in step S208), the common region determination unit 32 detects Y coordinates at an upper left point in the character-line image Li and Y coordinates at an upper left point in the character-line image Mk, and determines whether or not the difference between the Y coordinates at the upper left point in the character-line image Li and the Y coordinates at the upper left point in the character-line image Mk is less than a threshold T5 (step S210).

In the case where it is determined in step S208 that the difference between the X coordinates at the upper left point in the character-line image Li and the X coordinates at the upper left point in the character-line image Mk is equal to or more than the threshold T4 (No in step S208), the common region determination unit 32 provides a flag indicating that processing has been completed to the character-line image Mk (step S214).

In the case where it is determined in step S210 that the difference between the Y coordinates at the upper left point in the character-line image Li and the Y coordinates at the upper left point in the character-line image Mk is less than the threshold T5 (Yes in step S210), the common region determination unit 32 determines that the character-line image Li and the character-line image Mk are similar to each other and a region including the character-line image Li and a region including the character line image Mk are thus page common regions (step S212).

In the case where it is determined in step S210 that the difference between the Y coordinates at the upper left point in the character-line image Li and the Y coordinates at the upper left point in the character-line image Mk is equal to or more than the threshold T5 (No in step S210), the common region determination unit 32 provides a flag indicating that processing has been completed to the character-line image Mk (step S214).

Then, the processing of steps S200 to S214 is repeatedly performed for all the character-line images of the two pieces of image data (step S216).

Next, a specific example of processing of the differential image generation device 16 according to this exemplary embodiment will be described in detail with reference to FIGS. 7 to 10.

First, the image data reception unit 28 receives two pieces of image data, that is, pages 1 and 2 of old image data, as illustrated in FIG. 7A, on which correction has not been performed, and pages 1 and 2 of new image data, as illustrated in FIG. 7B, on which correction has been performed. As illustrated in FIGS. 7A and 7B, a footer is provided to each page of the old image data and the new image data. Furthermore, the character size in the body is different between the old image data and the new image data, and a change occurs in the contents of the body across plural pages.

Figures 8, 9:
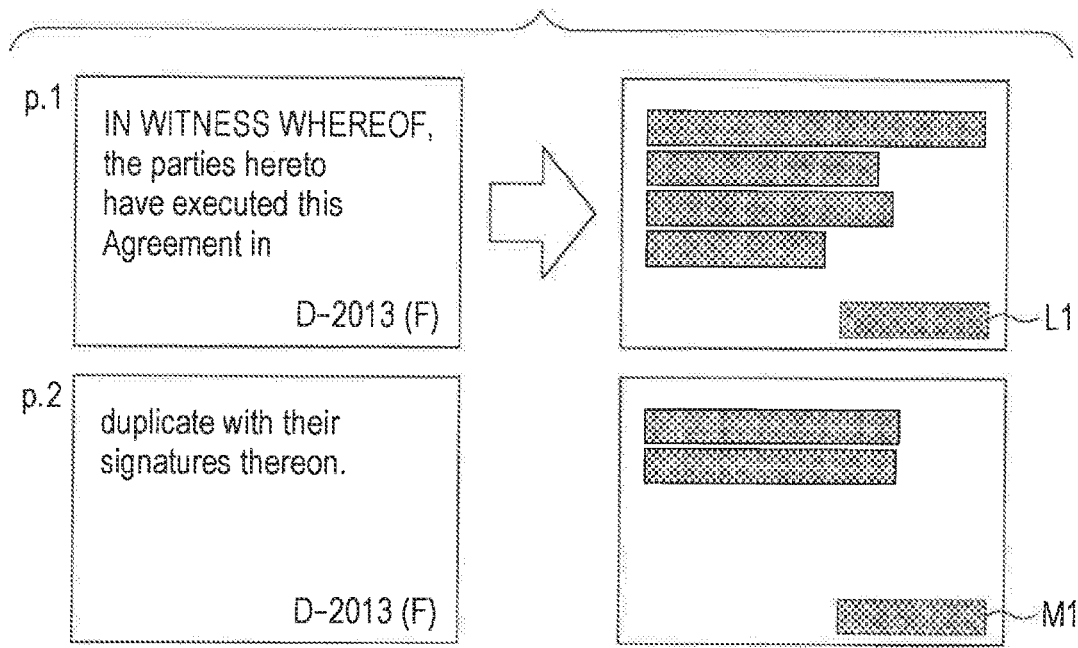
FIG. 8 is a diagram for explaining the details of a character line extraction process (step S12) illustrated in FIG. 4.
FIG. 9 is a diagram for explaining the character line extraction process illustrated in FIG. 8.

As illustrated in FIG. 8, the character line extraction unit 30 extracts character-line images L1, M1, and so on included in individual pages of the old image data received by the image data reception unit 28. In a similar manner, the character line extraction unit 30 extracts character-line images included in individual pages of the new image data. Processing performed on the old image data is similar to that performed on the new image data. Therefore, a redundant explanation will be omitted.

Figure 6:
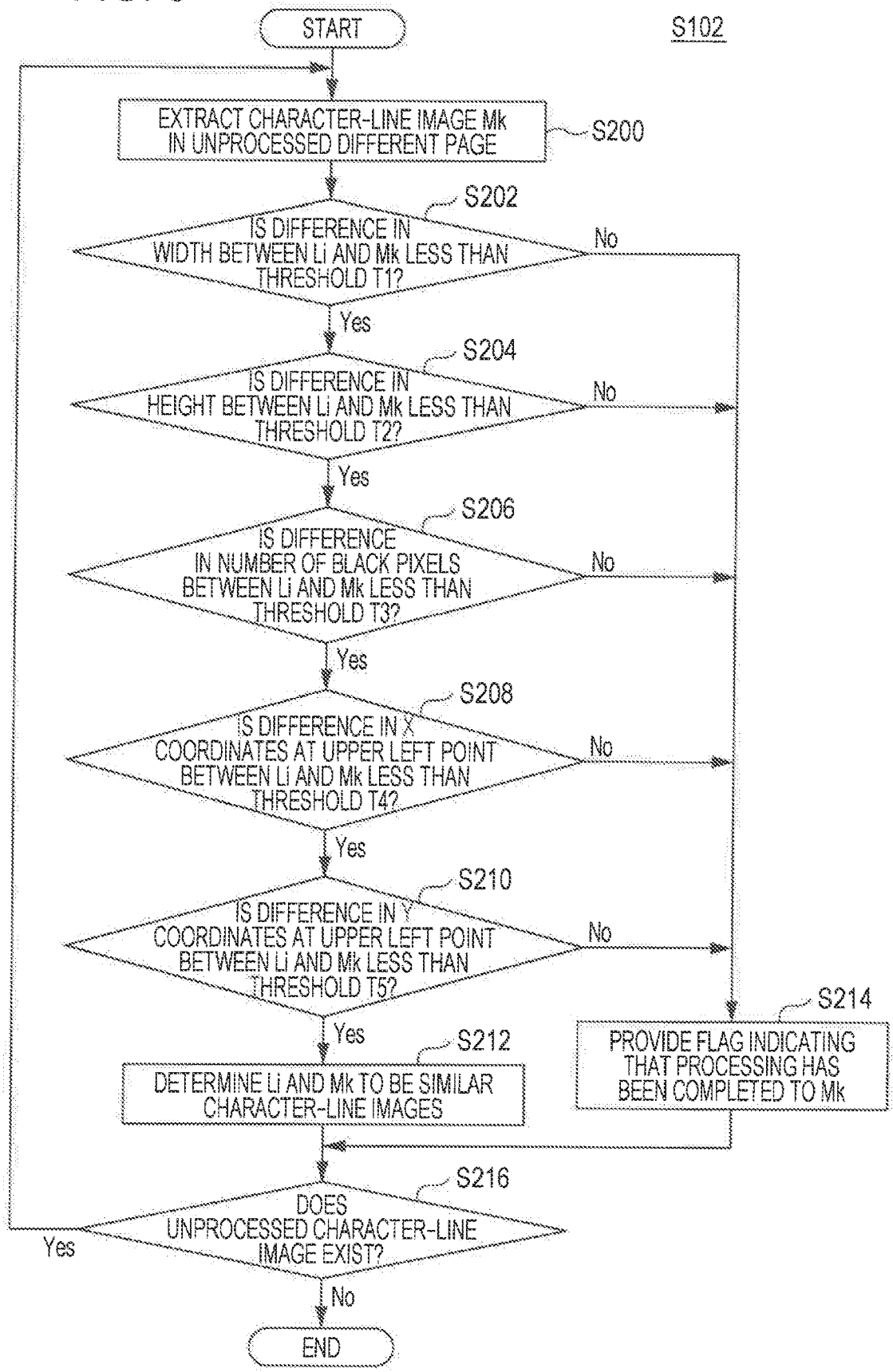
FIG. 6 is a flowchart for explaining the details of a similar character-line image collation process (step S102) illustrated in FIG. 5.

Then, as illustrated in FIG. 9, the common region determination unit 32 detects X coordinates and Y coordinates at upper left points, height, width, and the number of black pixels of the character-line images L1, M1, and so on, determines, as illustrated in FIG. 6, whether or not the difference between the width of the character-line image L1 and the width of the character-line image M1 is less than the threshold T1, whether or not the difference between the height of the character-line image L1 and the height of the character-line image M1 is less than the threshold T2, whether or not the difference between the number of black pixels in the character-line image L1 and the number of black pixels in the character-line image M1 is less than the threshold T3, whether or not the difference between the X coordinates at the upper left point, which is an end point, of the character-line image L1 and the X coordinates at the upper left point, which is an end point, of the character-line image M1 is less than the threshold T4, and whether or not the difference between the Y coordinates at an upper left point, which is an end point, of the character-line image L1 and the Y coordinates at an upper left point, which is an end point, of the character-line image M1 is less than the threshold T5, and determines whether or not a region including the character-line image L1 and a region including the character-line image M1 are page common regions.

Specifically, for example, let each of the thresholds T1 to T5 be 5. As illustrated in FIG. 9, the difference in width between the character-line image L1 and the character-line image M1 is 0, the difference in height is 0, the difference in the number of black pixels is 2, the difference in X coordinates is 2, and the difference in Y coordinates is 0, and all the differences are thus less than the corresponding thresholds. Therefore, the common region determination unit 32 determines that the character-line image L1 and the character-line image M1 are similar to each other, and thus determines that a region including the character-line image L1 and a region including the character-line image are page common regions.

Figure 10A:
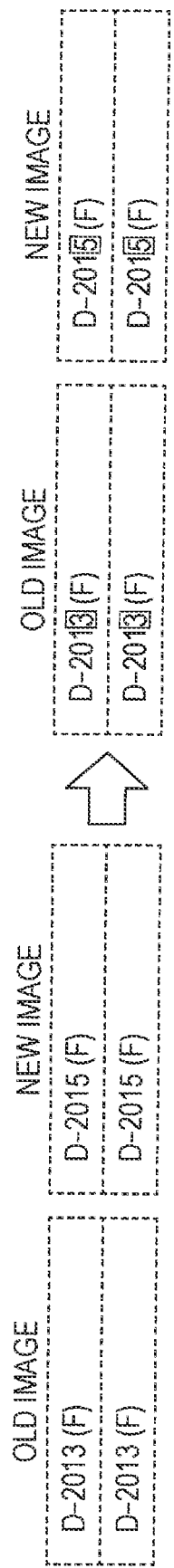
FIG. 10A is a diagram illustrating an example of a result obtained by detecting a difference in a page common region between new and old image data.
Figure 10B:
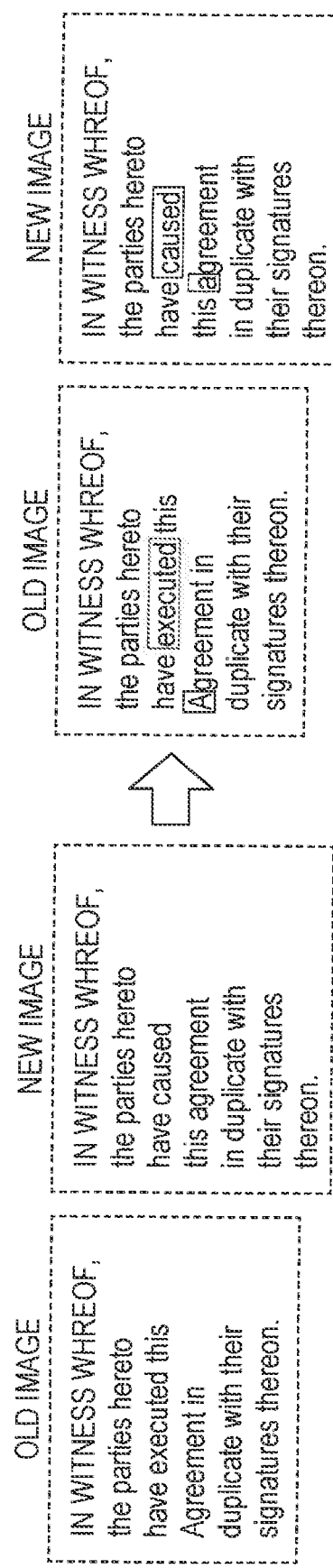
FIG. 10B is a diagram illustrating an example of a result obtained by detecting a difference in a page inherent region between new and old image data.

When it is determined that the character-line image L1 and the character-line image M1 are page common regions, the character-line image L1 and the character-line image M1, which are determined to be page common regions, are extracted from individual pages, as illustrated in a left part of FIG. 10A. Then, regions other than the regions including the character-line image L1 and the character-line image M1 in individual pages are estimated as page inherent regions and are extracted, and the page inherent regions, which are arranged in page 1 and page 2, are connected, as illustrated in a left part of FIG. 10B.

Then, the processing described above is performed on each of the new image data and the old image data, and comparison is performed between the page common regions extracted from the individual pages and between the extracted and connected page inherent regions. As illustrated in a right part of each of FIGS. 10A and 10B, a difference between the new image data and the old image data is indicated in each of the new and old image data, for example, by enclosing the different part in a frame, underlining the different part, indicating the different part in bold, or indicating the different part in a different color.

Figure 11:
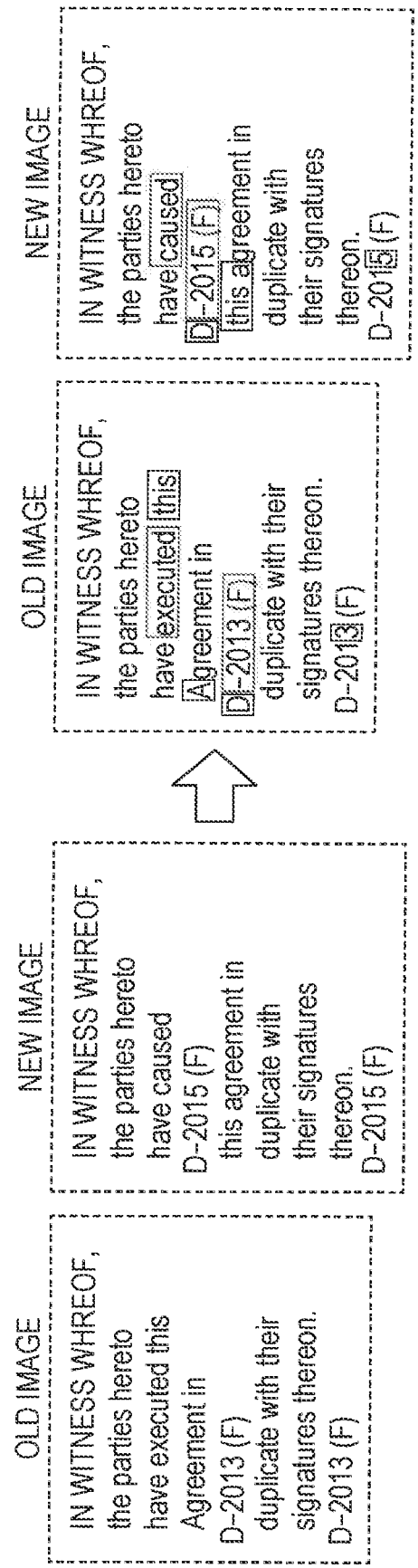
FIG. 11 is a diagram illustrating a result obtained by detecting a difference between new and old image data using a differential image generation device according to a comparative example.

FIG. 11 is a diagram illustrating a result obtained by detecting a difference from new and old image data using a differential image generation device according to a comparative example.

The differential image generation device according to a comparative example does not determine a footer (page common region). Therefore, in the case where there is a change across plural pages when a difference between two pieces of image data including a header or footer is detected, the footer is included in the body, as illustrated in FIG. 11, and an accurate detection may not be easily achieved. However, the differential image generation device 16 according to this exemplary embodiment automatically determines page common regions from individual pages, extracts and connects page inherent regions from the individual pages, and compares the two pieces of image data in a separate manner. Therefore, a difference may be detected with high accuracy.

Figure 12:
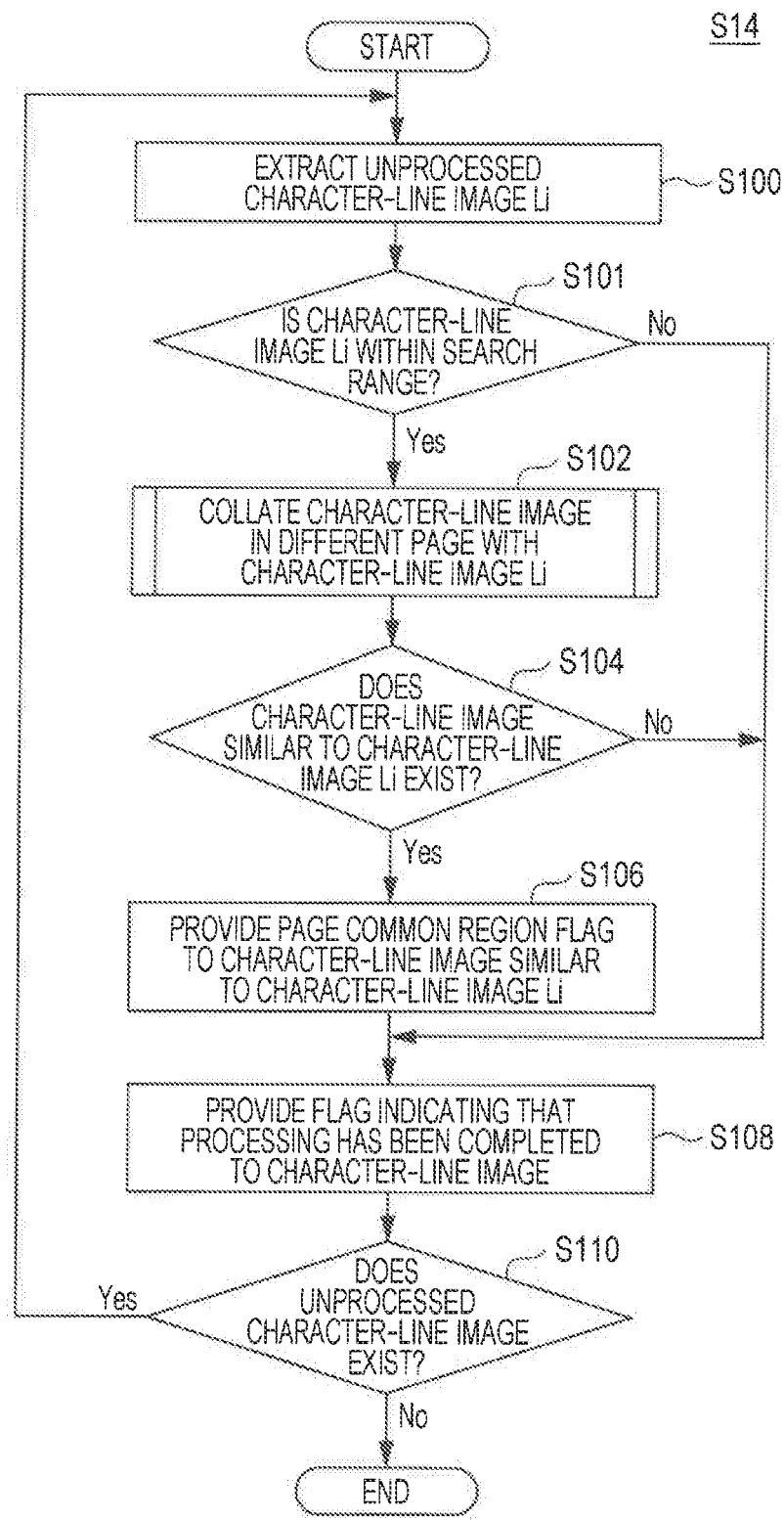
FIG. 12 is a flowchart for explaining the details of a first modification of the page common region determination process (step S14) according to the exemplary embodiment.

Next, a first modification of the page common region determination process (step S14) illustrated in FIG. 5 will be described with reference to a flowchart of FIG. 12. The first modification is different from the page common region determination process illustrated in FIG. 5 in that a range for searching for a page common region is sent in advance (step S101).

First, the common region determination unit 32 extracts an unprocessed character-line image Li extracted by the character line extraction unit 30 (step S100).

Then, the common region determination unit 32 determines whether or not the character-line image Li is within a predetermined search range (step S101).

Figure 13:
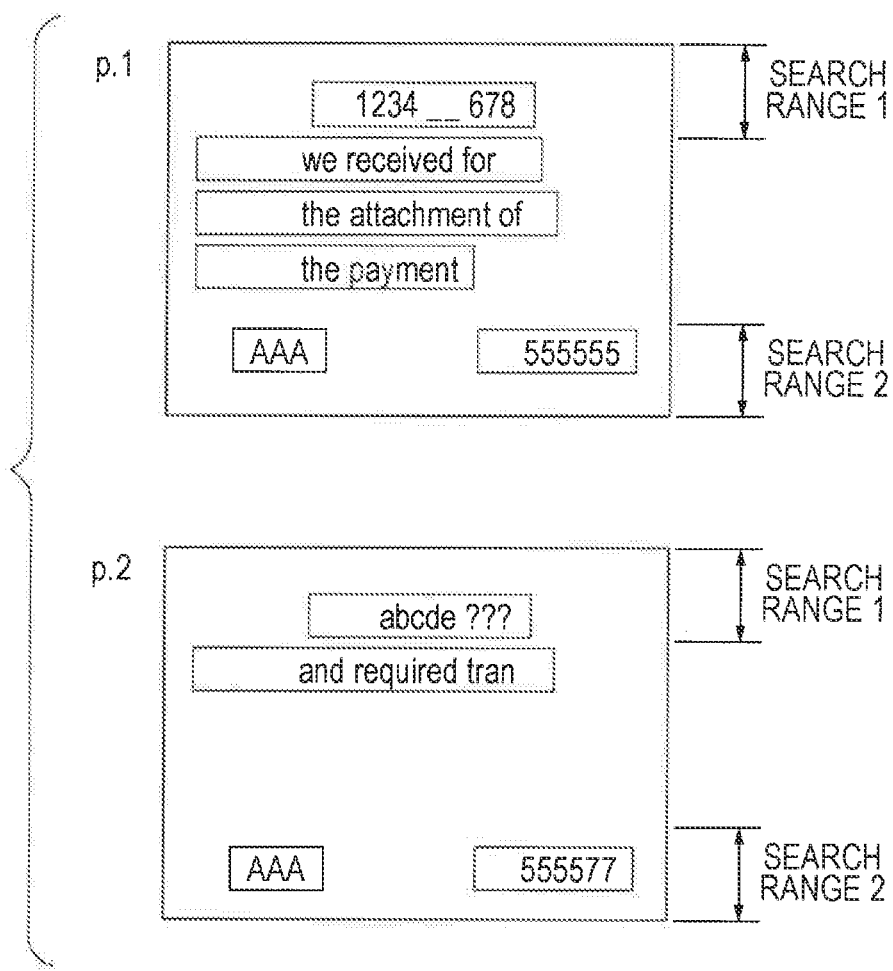
FIG. 13 is a diagram for explaining the details of the page common region determination process illustrated in FIG. 12.

Specifically, as illustrated in FIG. 13, a header is set to be indicated in an upper part of a page. Therefore, a search range for a header in each page is set in advance to a search range 1, which is a predetermined range from a page upper end. Furthermore, a footer is set to be indicated in a lower part of a page. Therefore, a search range for a footer in each page is set in advance to a search range 2, which is a predetermined range from a page lower end. That is, it is determined whether or not the character-line image Li is within the search range 1 or the search range 2.

In the case where the character-line image Li is within the search range 1 or the search range 2 (Yes in step S101), the character-line image Li is collated with a character-line image in the above-described different page (step S102). In the case where a character-line image similar to the character-line image Li exists in the different page (Yes in step S104), a region including the character-line image Li and a region including the character-line image similar to the character-line image Li are determined to be page common regions. Then, a page common region flag is provided to each of the character-line image Li and the character-line image similar to the character-line image Li (step S106), and a flag indicating that processing has been completed is provided to each of the character-line image Li and the character-line image similar to the character-line image Li (step S108).

In the case where it is determined in step S101 that the character-line image Li is not within the search range 1 or the search range 2 (No in step S101), a flag indicating that processing has been completed is provided to the character-line image Li (step S108).

In the case where it is determined in step S104 that no character-line image similar to the character-line image Li exists (No in step S104), a flag indicating that processing has been completed is provided to the character-line image Li (step S108).

Then, the processing of steps S100 to S108 is repeatedly performed for all the character-line images in the two pieces of image data (step S110).

Figure 14:
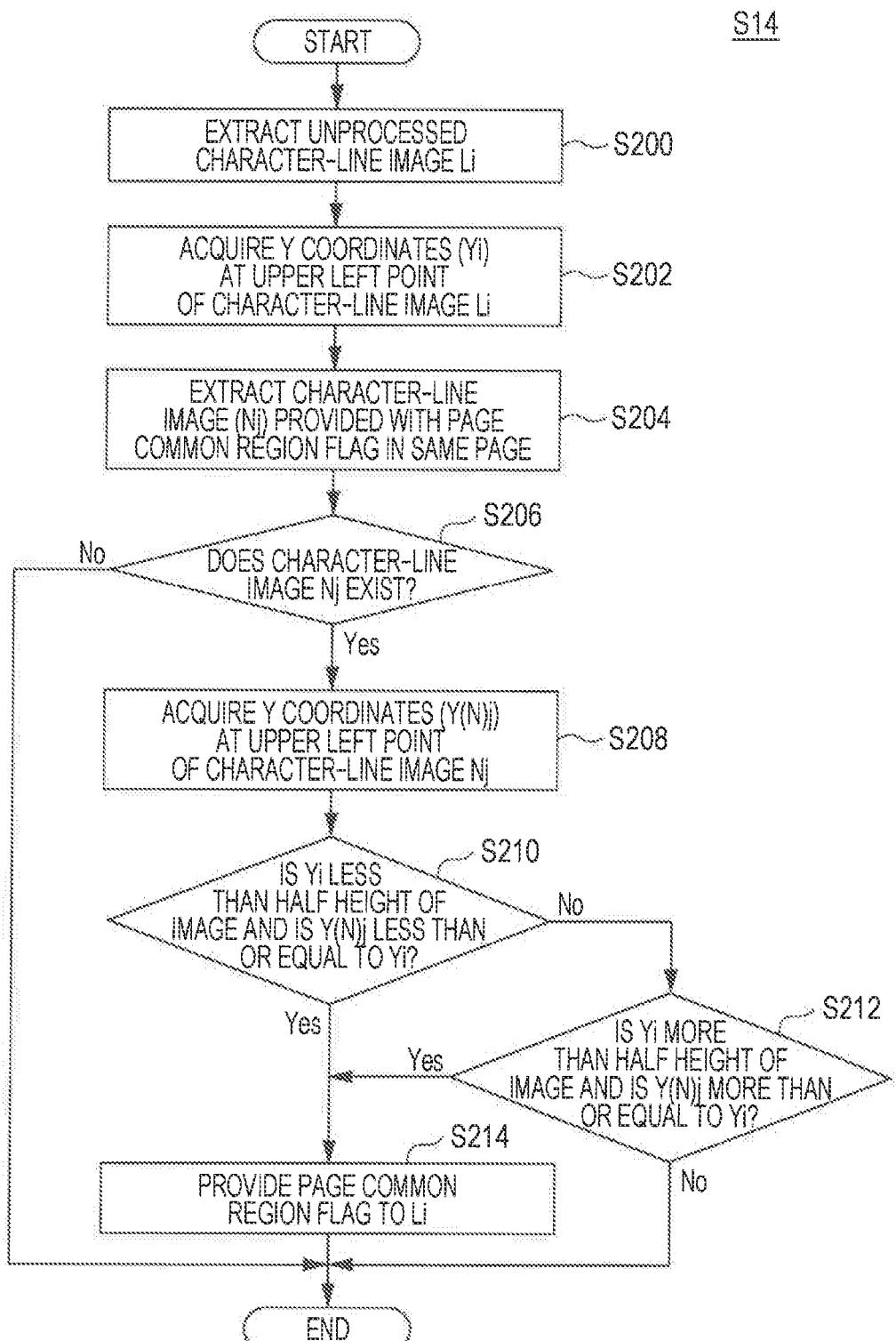
FIG. 14 is a flowchart for explaining the details of a second modification of the page common region determination process (step S14) according to the exemplary embodiment.

Next, a second modification of the page common region determination process (step S14) illustrated in FIG. 5 will be described with reference to a flowchart of FIG. 14. In the second modification, a determination for an unprocessed character-line image Li is performed using a character-line image Nj which is determined to be a page common region within the same page.

The common region determination unit 32 extracts an unprocessed character-line image Li extracted by the character line extraction unit 30 (step S200). Then, the common region determination unit 32 acquires Y coordinates (Yi) at an upper left point of the character-line image Li (step S202). Then, the common region determination unit 32 extracts a character-line image Nj provided with a page common region flag in the same page (step S204).

Figure 15:
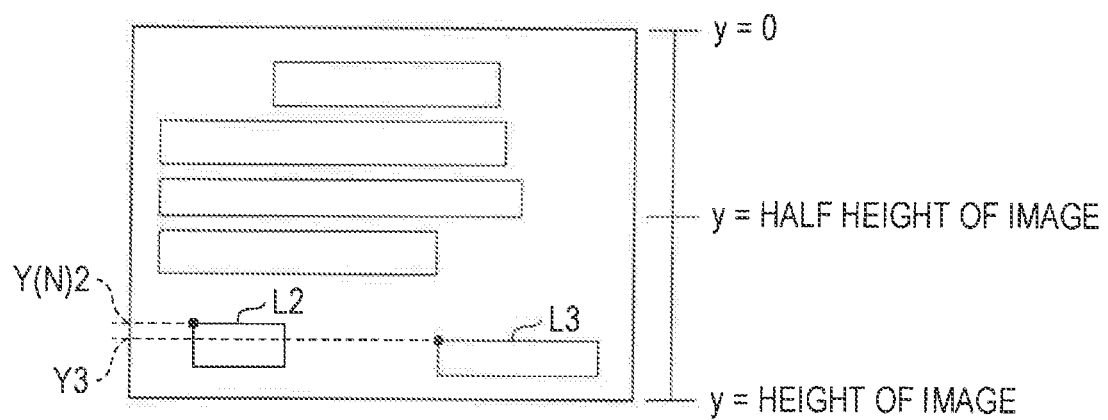
FIG. 15 is a diagram for explaining the details of the page common region determination process illustrated in FIG. 14.

In the case where no character-line image Nj provided with a page common region flag exists in the same page (No in step S206), the process ends. In the case where a character-line image Nj provided with a page common region flag exists in the same page (Yes in step S206), the common region determination unit 32 acquires Y coordinates (Y(N)j) at an upper left point of the character-line image Nj (step S208). In the case where the Y coordinates (Yi) at the upper left point of the character-line image Li are less than half the image height and are equal to or more than the Y coordinates (Y(N)j) at the upper left point of the character-line image Nj provided with the page common region flag when the Y coordinates at an upper end of paper are represented by 0 as illustrated in FIG. 15 (Yes in step S210), a region including the character-line image Li is determined to be a header, which is a page common region, and a page common region flag is provided to the character-line image Li (step S214).

In the case where it is determined in step S210 that the condition that the Y coordinates (Yi) at the upper left point of the character-line image Li are less than half the image height and are equal to or more than the Y coordinates (Y(N)j) at the upper left point of the character-line image Nj provided with the page common region flag is not satisfied (No in step S210), when the Y coordinates (Yi) at the upper left point of the character-line image Li are more than half the image height and are less than or equal to the Y coordinates (Y(N)j) at the upper left point of the character-line image Nj provided with the page common region flag (Yes in step S212), a region including the character-line image Li is determined to be a footer, which is a page common region, and a page common region flag is provided to the character-line image Li (step S214).

In the case where it is determined in step S212 that the condition that the Y coordinates (Yi) at the upper left point of the character-line image Li are more than half the image height and are less than or equal to the Y coordinates (Y(N)j)

at the upper left point of the character-line image Nj provided with the page common region flag is not satisfied (No in step S212), the process ends.

Specifically, for example, regarding a character-line image L3 illustrated in FIG. 15, Y coordinates (Y3) at an upper left point of the character-line image L3 are more than half the image height and are less than or equal to Y coordinates (Y(N)2) at an upper left point of a character-line image L2 in a page common region, and therefore, the common region determination unit 32 determines a region including the character-line image L2 and a region including the character-line image L3 to be page common regions.

That is, based on a known page common region, a page common region may be automatically determined.

Figure 16:
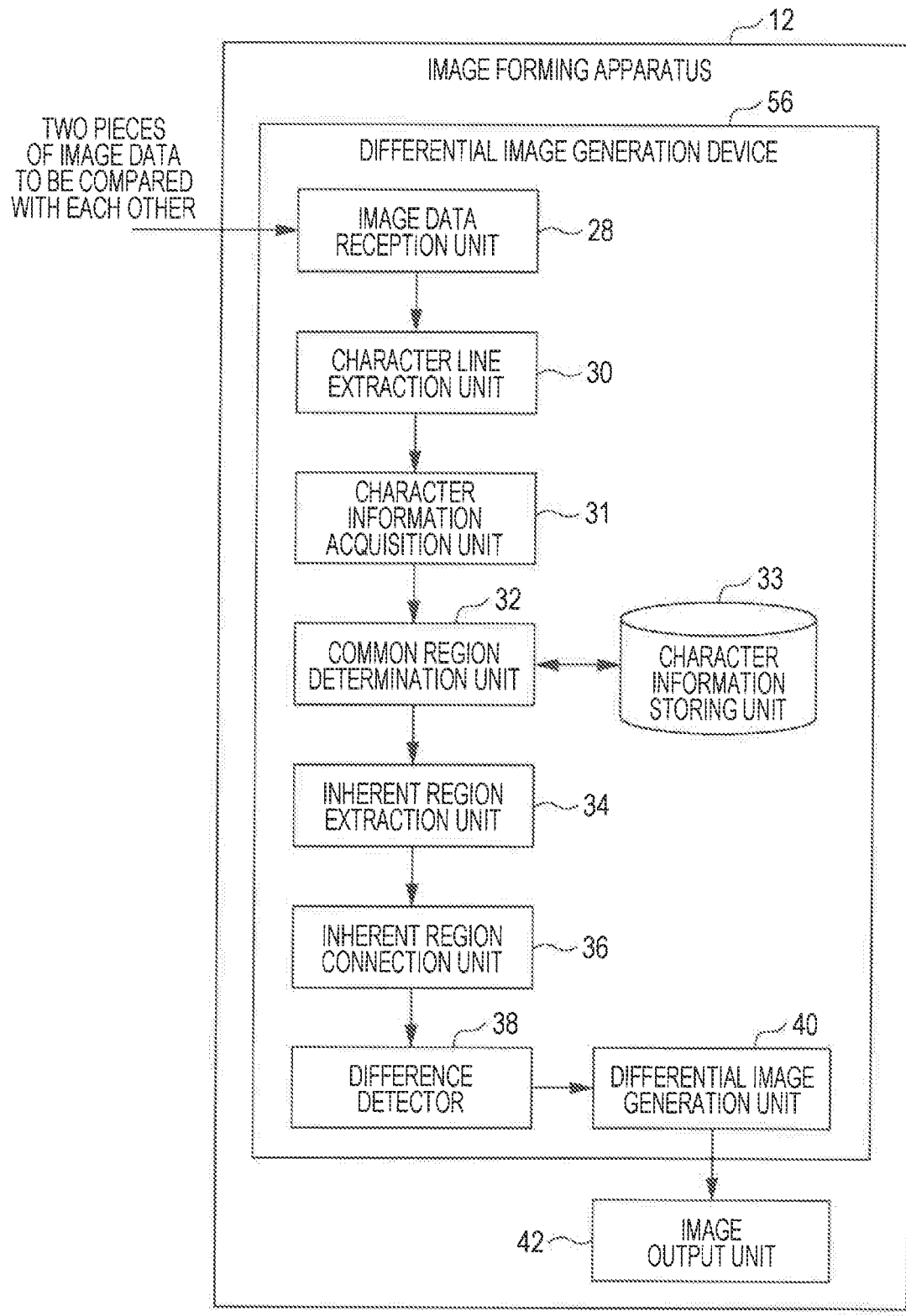
FIG. 16 is a block diagram illustrating a functional configuration of a differential image generation device according to another exemplary embodiment.
Figure 17:
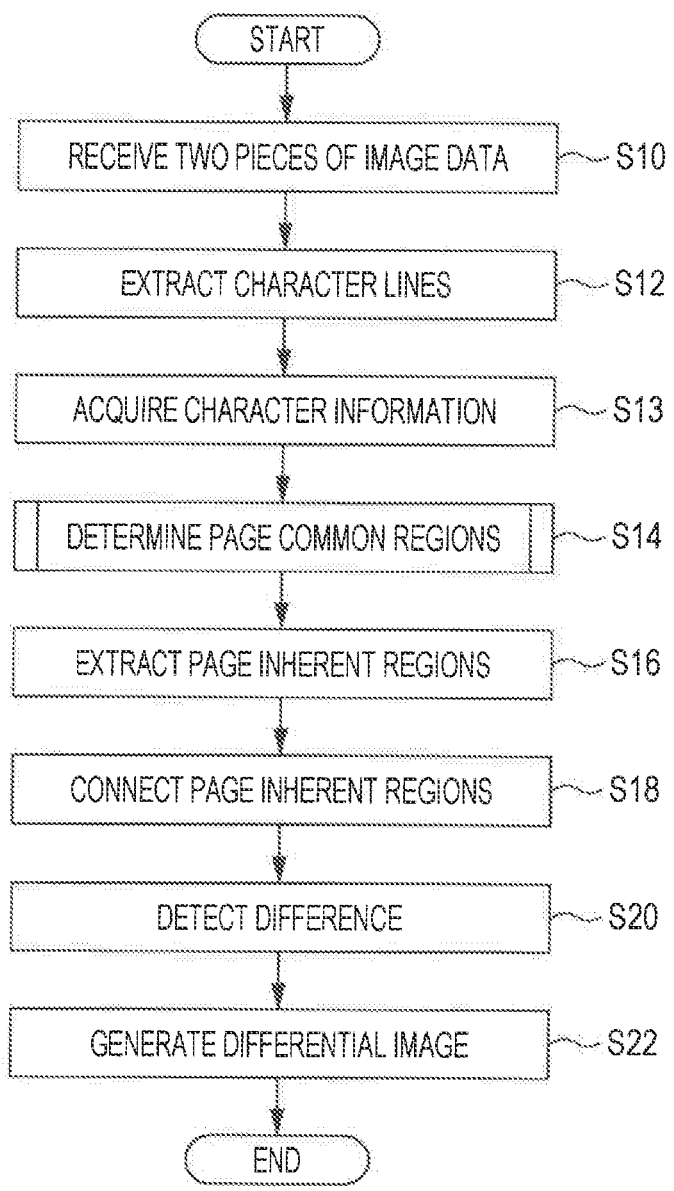
FIG. 17 is a flowchart illustrating a flow of a process of a differential image generation process according to another exemplary embodiment.

FIG. 16 is a block diagram illustrating a functional configuration of a differential image generation device 56 according to another exemplary embodiment. FIG. 17 is a diagram illustrating a flowchart of an operation of the differential image generation device 56.

The differential image generation device 56 is different from the differential image generation device 16 according to the foregoing exemplary embodiment in that the differential image generation device 56 includes a character information acquisition unit 31 and a character information storing unit 33.

The character information acquisition unit 31 acquires character information such as a character code, character color, and the like for a character-line image extracted by the character line extraction unit 30.

The character information storing unit 33 stores registration information and the like in which character information such as a character code and regular expression such as a page number are registered.

The common region determination unit 32 determines a page common region which is in common among plural pages of the same document, based on the character information acquired by the character information acquisition unit 31 and the character information such as a character code and registration information stored in the character information storing unit 33.

First, the image data reception unit 28 receives image data of two pieces of document data to be compared with each other read with a scanner, which is not illustrated figures, installed at the image forming apparatus 12 (step S10). Then, the character line extraction unit 30 extracts character-line images included in the plural pieces of image data received by the image data reception unit 28 (step S12), and the character information acquisition unit 31 acquires character information from the character-line images of individual pages extracted by the character line extraction unit 30 (step S13).

Then, the common region determination unit 32 determines, based on the character information acquired by the character information acquisition unit 31 and the character information and registration information stored in the character information storing unit 33, whether or not regions including character-line images of individual pages are page common regions (step S14).

Then, the inherent region extraction unit 34 extracts, as page inherent regions, regions other than the regions including the character-line images determined to be page common regions by the common region determination unit 32 from the two pieces of image data to be compared with each other (step S16).

Then, the inherent region connection unit 36 connects the page inherent regions extracted by the inherent region extraction unit 34 (step S18).

The difference detector 38 detects, for the two pieces of image data, a difference between the two pieces of image data by comparing the page common regions in the individual pages and comparing the connected page inherent regions, separately (step S20). For example, the difference detector 38 detects portions different between old image data and new image data. Then, the differential image generation unit 40 generates, for each of the two pieces of image data, a differential image, which represents the difference between the two pieces of image data detected in step S20 (step S22), and transmits the generated differential image to the image output unit 42 of the image forming apparatus 12.

A method for using optical character recognition (OCR) for reading two pieces of image data with a scanner installed at the image forming apparatus 12 is an example of a method for detecting a character code included in two pieces of image data. In this case, characters included in two pieces of image data are recognized by OCR, and character codes of the recognized characters are acquired.

In the above specific example, an explanation is provided in which a detected difference in a differential image is enclosed in a frame. However, the present invention is not limited to this. Any method, such as indicating a detected difference in bold or indicating a difference in a different color, may be used as long as a difference between two pieces of image data may be visually understood.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a processor programmed to function as:
a common region determination unit that determines page common regions which are in common among a plurality of pages of document data;
an inherent region extraction unit that extracts, as page inherent regions, regions other than the page common regions determined by the common region determination unit from image data in the plurality of pages; and
a common region difference detector that detects, for detecting a difference between two pieces of document data, a difference between the page common regions in individual pages determined by the common region determination unit,
wherein the common region determination unit determines to be page common regions those regions in image data of different pages of a same document that include similar character lines: (i) within a predetermined range, the predetermined range being, for each page of the different pages, a range extending from one of an upper end of the image data of the page or a lower end of the image data of the page; and (ii) in the different pages.

2. The image processing apparatus according to claim 1, wherein the processor is further programmed to function as:

an inherent region connection unit that connects a plurality of page inherent regions extracted by the inherent region extraction unit; and an inherent region difference detector that detects, for detecting a difference between two pieces of document data, a difference between the plurality of page inherent regions connected by the inherent region connection unit.

3. The image processing apparatus according to claim 1, wherein the common region determination unit determines, in a case where character lines included in two pieces of image data in different pages of a same document include two character lines having a difference in at least one of width and height between the different pages, the difference being less than a threshold, regions including the two character lines to be page common regions.

4. The image processing apparatus according to claim 1, wherein the common region determination unit determines, in a case where character lines included in two pieces of image data in different pages of a same document each include two character lines having a difference in coordinates at an end point of a character line between the different pages, the difference being less than a threshold, regions including the two character lines to be page common regions.

5. The image processing apparatus according to claim 1, wherein the processor is further programmed to function as:
an image feature acquisition unit that acquires image features included in a character line,
wherein the common region determination unit determines, in a case where character lines included in two pieces of image data in different pages of a same document each include two character lines having the image features acquired by the image feature acquisition unit in the different pages, regions including the two character lines to be page common regions.

6. The image processing apparatus according to claim 1, wherein the processor is further programmed to function as:
a character information acquisition unit that acquires character information included in a character line,
wherein the common region determination unit determines, in a case where character lines included in two pieces of image data in different pages of a same document each include two character lines having the character information acquired by the character information acquisition unit in the different pages, regions including the two character lines to be page common regions.

7. The image processing apparatus according to claim 1, wherein the processor is further programmed to function as:
a character information acquisition unit that acquires character information included in a character line,
wherein the common region determination unit determines, in a case where the character information acquired by the character information acquisition unit in different pages of a same document matches registration information registered as a page common region, regions including the character lines to be page common regions, wherein registration information comprises at least one of a character code and a page number.

8. The image processing apparatus according to claim 1, wherein the common region determination unit determines, in a case where character lines included in image data in a same page of a same document include a region including a character line as a page common region in the same page of the same document, a region including a character line within a predetermined range of distances from the region including the character line as the page common region to be a page common region.

9. A non-transitory computer readable medium storing a program causing a computer to execute a process, the process comprising:
determining page common regions which are in common among a plurality of pages of document data;
extracting, as page inherent regions, regions other than the determined page common regions from image data in the plurality of pages; and
detecting, for detecting a difference between two pieces of document data, a difference between the determined page common regions in individual pages,
wherein determining page common regions includes determining to be page common regions those regions in image data of different pages of a same document that include similar character lines: (i) within a predetermined range, the predetermined range being, for each page of the different pages, a range extending from one of an upper end of the image data of the page or a lower end of the image data of the page; and (ii) in the different pages.

\* \* \* \* \*